United States Patent
Fruge et al.

(10) Patent No.: US 6,896,942 B2
(45) Date of Patent: *May 24, 2005

(54) COATING COMPOSITION COMPRISING COLLOIDAL SILICA AND GLOSSY INK JET RECORDING SHEETS PREPARED THEREFROM

(75) Inventors: Daniel Ray Fruge, Wilmington, DE (US); Demetrius Michos, Clarksville, MD (US)

(73) Assignee: W. R. Grace & Co. -Conn., Columbia, MD (US)

( * ) Notice: Subject to any disclaimer, the term of this patent is extended or adjusted under 35 U.S.C. 154(b) by 42 days.

This patent is subject to a terminal disclaimer.

(21) Appl. No.: 10/391,270

(22) Filed: Mar. 18, 2003

(65) Prior Publication Data

US 2003/0198759 A1 Oct. 23, 2003

Related U.S. Application Data

(60) Provisional application No. 60/373,166, filed on Apr. 17, 2002.

(51) Int. Cl.[7] .............................................. B41M 5/40
(52) U.S. Cl. ................ 428/32.29; 428/32.33; 428/32.34; 428/32.35
(58) Field of Search ........................ 428/32.29, 32.33, 428/32.34, 32.35, 32.3

(56) References Cited

U.S. PATENT DOCUMENTS

| | | | | |
|---|---|---|---|---|
| 2,244,325 A | 6/1941 | Bird | ............................ | 252/313 |
| 2,574,902 A | 11/1951 | Bechtold | ..................... | 252/313 |
| 2,577,484 A | 12/1951 | Rule | ............................ | 252/313 |
| 2,577,485 A | 12/1951 | Rule | ............................ | 252/313 |
| 2,631,134 A | 3/1953 | Iler | ............................ | 252/313 |
| 2,750,345 A | 6/1956 | Alexander | ..................... | 252/313 |
| 2,773,028 A | 12/1956 | Monet | ......................... | 210/8.5 |
| 2,892,797 A | 6/1959 | Alexander et al. | ........... | 252/313 |
| 3,012,972 A | 12/1961 | Rule | ............................ | 252/313 |
| 3,440,174 A | 4/1969 | Albrecht | ....................... | 252/313 |
| 3,969,266 A | 7/1976 | Iler | ............................ | 252/313 |
| 5,576,088 A | 11/1996 | Ogawa et al. | ................ | 428/327 |
| 5,756,226 A * | 5/1998 | Valentini et al. | ........... | 428/32.35 |
| 5,966,150 A * | 10/1999 | Lester et al. | ................... | 347/43 |
| 6,086,700 A * | 7/2000 | Valentini et al. | ............. | 156/235 |
| 6,309,709 B1 * | 10/2001 | Valentini et al. | .......... | 427/393.5 |
| 6,497,940 B1 * | 12/2002 | Valentini et al. | .......... | 428/32.25 |
| 2002/0034613 A1 * | 3/2002 | Liu et al. | ..................... | 428/195 |
| 2003/0180478 A1 * | 9/2003 | Fruge et al. | .................. | 428/31 |
| 2003/0180480 A1 * | 9/2003 | Fruge et al. | ............... | 428/32.1 |
| 2003/0180483 A1 * | 9/2003 | Fruge et al. | .............. | 428/32.33 |
| 2003/0198759 A1 * | 10/2003 | Fruge et al. | ................ | 428/32.1 |

FOREIGN PATENT DOCUMENTS

| | | | | |
|---|---|---|---|---|
| EP | 0 586 846 | 3/1994 | ............ | B41M/5/00 |
| EP | 0 685 344 | 12/1995 | ............ | B41M/5/00 |
| EP | 0 759 365 | 2/1997 | ............ | B41M/5/00 |
| EP | 1 008 457 | 6/2000 | ............ | B41M/5/00 |
| EP | 1 016 546 | 7/2000 | ............ | B41M/5/00 |
| WO | 00 20221 | 4/2000 | ............ | B41M/5/00 |

OTHER PUBLICATIONS

G. W. Sears, Jr., Analytical Chemistry, vol. 28, p. 1981 (1956).

* cited by examiner

Primary Examiner—B. Shewareged
(74) Attorney, Agent, or Firm—William D. Bunch

(57) ABSTRACT

A coating composition comprising cationic colloidal silicas and ink jet recording sheets prepared from such coatings is described. The coating comprises binder and polydispersed cationic colloidal silica. The cationic colloidal silica preferably has an average particle size in the range of about 1 to about 300 nanometers. It has been discovered that if a cationic polydispersed colloidal silica is employed in a glossy coating formulation, the coating provides a specular gloss of at least 30 at 60° C., even at a relatively high silica solids to binder solids ratio of 1:1 or greater, but also a coating having good to excellent printability characteristics.

14 Claims, 1 Drawing Sheet

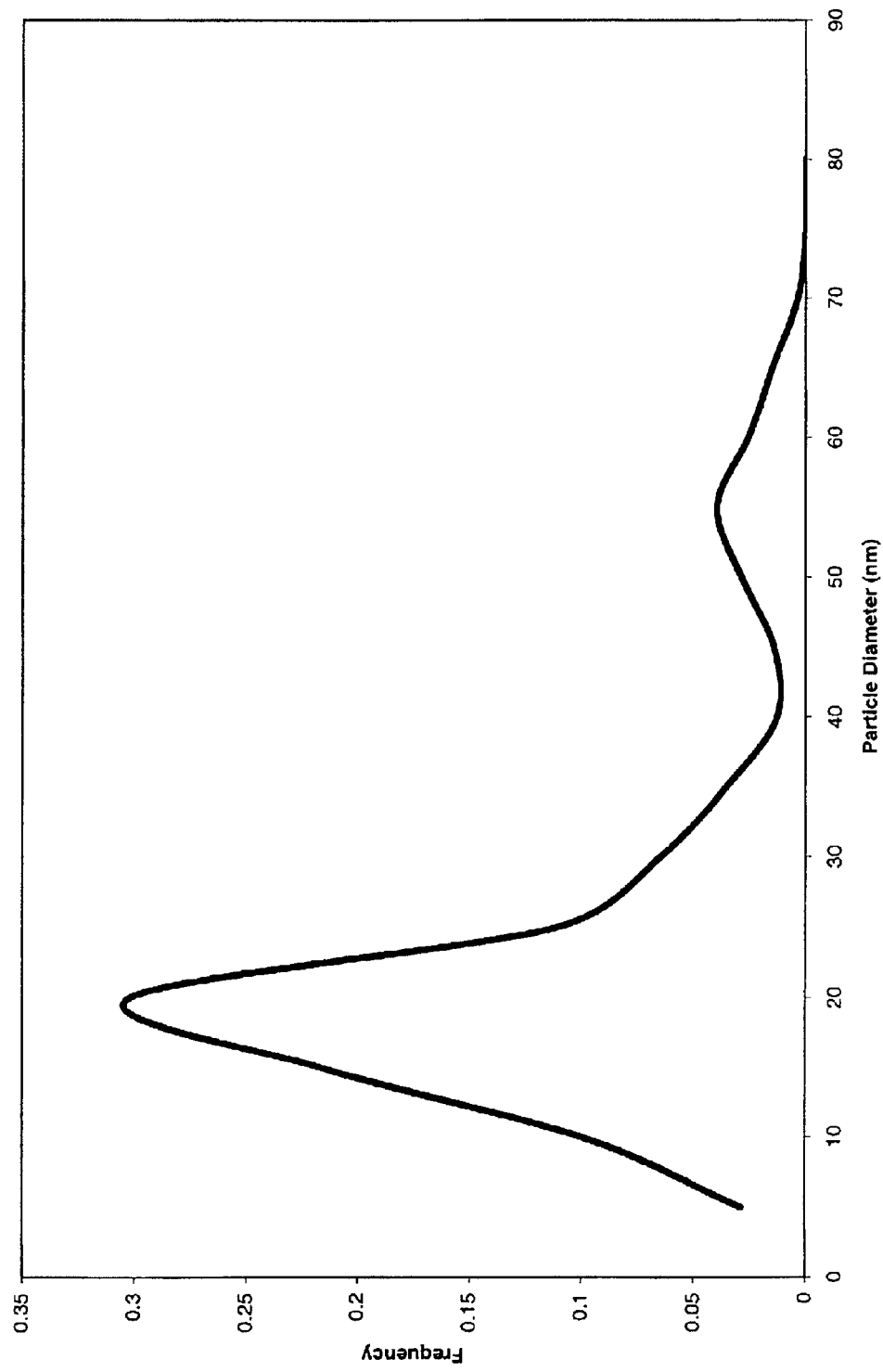
FIGURE

US 6,896,942 B2

COATING COMPOSITION COMPRISING COLLOIDAL SILICA AND GLOSSY INK JET RECORDING SHEETS PREPARED THEREFROM

This application claims priority under 35 U.S.C. § 119 of the following provisional application Ser. No(s). 60/373,166 and filing date(s) Apr. 17, 2002.

BACKGROUND OF THE INVENTION

The present invention relates to coated ink jet recording sheets and coating compositions used to prepare the same. In particular, the invention relates to coating compositions suitable for preparing glossy ink jet recording sheets which possess good printability characteristics.

Ink jet printing processes are well known. Such systems project ink droplets onto a recording sheet, e.g., paper, at varying densities and speed. When using multi-color ink jet systems, the process projects in very close proximity a number of different colored inks having varying properties and absorption rates. Indeed, these multi-color systems are designed to provide images which simulate photographic imaging, and such images require high resolution and color gamut. Accordingly, ink jet recording sheets must be able to absorb ink at high densities, in a capacity such that the colors deposited are bright and clear, at rates to effect quick drying, absorb ink so that it does not run or blot, and in a manner that results in smooth images.

To meet these goals, highly porous pigments, e.g., porous silicas, have been incorporated into paper coatings. Silica-based coating systems have been successful in meeting the printability goals. However, it has been difficult to obtain such properties and produce a non-matted, or glossy, finish typically seen in traditional photographic systems. The aforementioned porous pigments typically have porosities above 1 cc/g and have average particle sizes greater than 1 micron. Such particle sizes and porosities increase the surface roughness of the finished coating, thereby deflecting incident light so that it is scattered, thereby matting the coating.

To enhance the glossiness of such coatings, second gloss layers are provided on top of ink receptive layers prepared from the aforementioned porous pigments. These top layers are prepared from binder systems that are inherently glossy, or from layers comprising binder and much smaller sized inorganic oxide particles, e.g., conventional colloidal silica. The colloidal silica in the latter approach tends to enhance the ink receptive nature of the top coating, but are not large enough to cause surface deformations. There is, however, a tendency for the colloidal particles to agglomerate at high concentrations, thereby causing imperfections and surface roughness in the top layer, and thereby reducing gloss. Accordingly, lower concentrations (i.e., lower ratios of colloidal solids to binder solids) have been used when employing this approach.

It would therefore be quite desirable to increase the amounts of solid inorganic oxides in these top layers to further improve printability. Indeed, it would be desirable to use coating layers having at least 1:1 colloidal solids to binder solids ratios, and even more preferable to employ coatings having colloidal silica solids to binder ratios as high as 4:1, yet at the same time attain acceptable gloss.

Furthermore, coating systems for ink jet paper are frequently designed to have an overall cationic charge. Many of the inks employed in ink jet processes possess a negative charge; and it, therefore, is desirable for the coating components to have an opposite charge to affix the ink. Colloidal alumina possesses a positive charge and has been widely used as a coating pigment for that purpose. Cationic dye fixing components and cationic binders are also employed. Indeed, the presence of these latter cationically charged materials usually require that the pigment components in the coating be cationic or at least nonionic. Otherwise the materials in the coating tend to aggregate, thereby creating surface imperfections and reducing gloss.

It has been recently discovered that certain cationic colloidal silicas which are deionized can be incorporated into glossy coatings at high levels. However, while such coatings provide good to excellent gloss, they have performance limitations with respect to printability. Certain of the recently developed cationic colloidal silicas also have a relatively short storage life. They either, after several days, become too viscous to be incorporated into a coating resin, or after relatively short periods of time, e.g., a couple of weeks, they are not useable because even though the colloidal silica has not gelled, it results in a matte coating after it is incorporated into the coating mixture. Accordingly, these recently developed colloidal silicas either would be more suitable for use as glossy overcoats placed over a separate ink receptive coating, or they would have to be used shortly after the sols are prepared. It, therefore, would be desirable, and it is a goal of this invention, to provide a coating layer comprising a relatively high content of silica solids which are cationic, yet also provide a coating having good to excellent printability, as well as provide a cationic colloidal silica having longer term storage stability.

BRIEF DESCRIPTION OF THE DRAWINGS

FIGURE illustrates a particle size distribution of a polydispersed colloidal silica used to make this invention.

SUMMARY OF INVENTION

The present invention provides ink jet recording sheets comprising a support and at least one coating layer thereon wherein the coating contains a ratio of cationic colloidal silica solids and binder solids of at least 1:1 by weight and the at least one coating has a specular gloss of at least 30 at 60°. The aforementioned cationic silica has a polydispersed particle size distribution and preferably has an average particle size in the range of about 1 to 300 nanometers. The cationic silica can be prepared by reacting the polydispersed colloidal silica with an organic compound containing a functional group which is reactive with silanol groups and a functional group having a positive charge, e.g., aminosilanes. The coating also comprises binders typically used to prepare ink jet recording sheets.

It has been discovered that cationic colloidal silica prepared in this fashion not only provides for colloidal silica which does not aggregate at relatively high solids contents, thereby reducing deformation and causing matting of the coating surface, but also provides coatings having good to excellent printability.

Accordingly, the present invention provides an ink jet recording sheet comprising a support and at least one coating layer thereon, said at least one coating layer (a) having a specular surface gloss of at least 30 at 60°, (b) comprising polydispersed cationic colloidal silica possessing a net positive charge, and (c) binder, wherein the colloidal silica solids and binder solids are present at a ratio of at least 1:1 by weight.

Suitable ink jet recording sheets include those above wherein the ratio of colloidal silica solids to binder solids is in the range of about 6:4 to about 4:1.

Another suitable ink jet recording sheet includes those wherein the aforementioned colloidal silica has an average particle size in the range of about 1 to about 300 nanometers.

Another suitable ink jet recording sheet includes those wherein the colloidal silica has a median particle size in the range of 15 to 100 nm and has a particle size distribution such that at least 80% of the particles span a size range of at least 30 nanometers and up to about 70 nanometers.

Another suitable embodiment of the aforementioned ink jet recording sheet includes those wherein at least one functional group is appended to the surface of the colloidal silica.

Another suitable ink jet recording sheet includes those wherein the aforementioned at least one functional group is selected from the group consisting of primary amines, secondary amines, tertiary amines and quaternary amines. An especially preferred embodiment of the invention is an ink jet recording sheet wherein the functional group is amino and the amino is appended to the silica through an alkyl linkage.

The invention also provides a coating composition comprising
(a) polydispersed cationic colloidal silica possessing a net positive charge, and
(b) binder
wherein silica solids of (a) and binder solids of (b) are present at a ratio of at least 1:1 by weight.

A suitable embodiment of the coating composition includes those coatings wherein the silica solids of (a) to binder solids of (b) is in the range of about 6:4 to about 4:1.

Another suitable coating composition includes those wherein the colloidal silica has an average particle size of about 1 to about 300 nanometers.

Another suitable coating composition includes those wherein the colloidal silica has a median particle size in the range of 15 to 100 nm and has a particle size distribution such that at least 80% of the particles span a size range of at least 30 nanometers and up to about 70 nanometers.

Another suitable embodiment includes those wherein at least one functional group is appended to the surface of the colloidal silica.

Another suitable coating composition includes those wherein the aforementioned at least one functional group is selected from the group consisting of primary amines, secondary amines, tertiary amines and quaternary amines.

Another suitable coating composition includes those wherein the at least one functional group is selected from the group consisting of primary amines, secondary amines, tertiary amines and quaternary amines.

Another suitable coating composition includes those wherein the functional group is amino and the amino is appended to the silica through an alkyl linkage.

DETAILED DESCRIPTION OF THE INVENTION

By the term "colloidal silica" or "colloidal silica sol" it is meant particles originating from dispersions or sols in which the particles do not settle from dispersion over relatively long periods of time. Such particles are typically below one micron in size. Colloidal silica having an average particle size in the range of about 1 to about 300 nanometers and processes for making the same are well known in the art. See U.S. Pat. Nos. 2,244,325; 2,574,902; 2,577,484; 2,577,485; 2,631,134; 2,750,345; 2,892,797; 3,012,972; and 3,440,174, the contents of which are incorporated herein by reference. Colloidal silicas having average particle sizes in the range of 15 to 100 nanometers are more preferred for this invention. Colloidal silicas can have a surface area (as measured by BET) in the range of 9 to about 2700 $m^2/g$.

Generally speaking, colloidal silica possesses a negative charge and therefore is anionic as a result of the loss of protons from silanol groups present on the silica's surface. For the purposes of this invention, colloidal silica is considered cationic if an anionic colloidal silica has been modified, e.g., physically coated or chemically treated, so that the colloidal silica possesses a net positive charge. A cationic silica thus would include those colloidal silicas in which the surface of the silica contains a sufficient number of cationic functional groups, e.g., an amino group discussed later below, such that the net charge on the silica surface is positive.

Preferably, the net positive charge occurs as a result of a positive charge present on functional groups appended to the surface of the colloidal silica. Even more preferably, the functional group is bonded to and/or pendent to the silica surface through a hydrogen or covalent bond. The functional group can be bonded directly to the silica, or it can be attached to the silica through a bond with an intermediate chemical moiety that is directly bonded to the functional group. Without being held to a particular theory, it is believed the bonding minimizes leaching of the functional group, or leaching or dissociation of any moiety from the functional group or the silica which would affect the gloss and printability performance of the resulting coating.

By "functional group" it is meant a combination of two or more elements which tend to remain together in reactions, typically behaving chemically as if they were individual entities, e.g., in respect to valence, ionization and related properties.

By "net positive charge" it is meant that the balance of charges on the silica is positive and therefore a silica can have a net positive charge if the silica possesses both negative charges and positive charges, provided the silica has been treated or otherwise modified so that the sum of the charges is positive, e.g., possesses a positive zeta potential of +0.01 mV or greater using a Zetasizer™ 3000HS from Malvern. Preferred embodiments of cationic colloidal silica have a zeta potential of +20 mV or greater.

The colloidal silica of this invention also is what is known as polydispersed colloidal silica. "Polydispersed" is defined herein as meaning a dispersion of particles having a particle size distribution in which the median particle size is in the range of 1–300 nanometers, preferably 15–100 nm, and which has a relatively large distribution span. Preferred distributions are such that 80% of the particles span a size range of at least 30 nanometers and can span up to 70 nanometers. The 80% range is measured by subtracting the $d_{10}$ particle size from the $d_{90}$ particle size generated using TEM-based particle size measurement methodologies described later below. This range is also referred to as the "80% span." One embodiment of polydispersed particles has particle size distributions which are skewed to sizes smaller than the median particle size. As a result, the distribution has a peak in that area of the distribution and a "tail" of particle sizes which are larger than the median. See FIGURE. The lower and upper particle size of the span encompassing 80% of the particles can be −11% to −70% and 110% to 160% of the median, respectively. A particularly suitable polydispersed silica has a median particle size in the range of 20 to 30 nanometers and 80% of the particles are between 10 and 50 nanometers in size, i.e., 80% of the distribution has a span of 40 nanometers.

The cationic polydispersed colloidal silica of this invention is preferably prepared by treating the surface of anionic polydispersed colloidal silica with an organic compound having a functional group having a positive charge and also having at least one group which is reactive with silanol groups on the surface of the colloidal silica. Preferably positive functional groups include, but are not limited to, amino groups or quaternary groups.

Particularly suitable organic compounds are aminosilanes. Suitable aminosilane compounds in the present invention have the formula

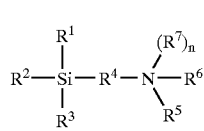

(I)

wherein $R^1$, $R^2$ and $R^3$ are independently selected from the group consisting of alkoxy radicals having from 1 to 8 carbon atoms, alkyl radicals having 1 to 8 carbon atoms and aryl radicals having 6 carbon atoms, with the proviso that at least one of $R^1$, $R^2$ and $R^3$ is an alkoxy radical; $R^4$ is selected from the group consisting of alkylene groups having from 1 to 18 carbon atoms and arylene and alkyl substituted arylene groups having from 6 to 10 carbon atoms; $R^5$, $R^6$ and $R^7$ is selected from the group consisting of hydrogen and alkyl groups having from 1 to 15 carbon atoms; and n has a value of 0 or 1. Preferably, n=0, each $R^1$, $R^2$ and $R^3$ are alkoxy radicals having from 1 to 3 carbon atoms and $R^5$ and $R^6$ are hydrogen. The aminosilane compounds may comprise a high purity product or mixture of aminosilane compounds conforming to the above formula I.

Representative of the aminosilane compounds include trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine. tributoxysilyl propyl amine, trimethoxysilyl butyl amine, triethoxysilyl butyl amine, tripropoxysilyl butyl amine, tributoxysilyl butyl amine, trimethoxysilyl pentyl amine, treithoxysilyl pentyl amine, tripropoxysilyl pentyl amine, tributoxysilyl pentyl amine, triemethoxysilyl hexyl amine, tributoxysilyl hexyl amine, trimethoxysilyl heptyl amine, trithoxysilyl heptyl amine, tripropoxysilyl amine, tributoxysilyl heptyl amine, trimethoxysilyl octyl amine, triethoxysilyl octyl amine, tripropoxysilyl octyl amine, tributoxysilyl octyl amine, and the like. Preferably, the aminosilane compound is triethoxysilyl propyl amine. Triethoxysilyl propyl amine is commercially available from Witco Corporation, OSI Specialties Group under the designation A-1100.

The treatment of the colloidal silica with the organic component, e.g., aminosilane, can usually be carried out by contacting the silica and the organic component in a suitable liquid medium. Examples of the liquid medium include water, alcohols such as methanol, ethanol or propanol, and mixtures of water with these alcohols. The treating temperature is generally from room temperature to the refluxing temperature of the medium. The amount of the organic component used is not strictly limited. Generally, it is advantageously used in an amount of at least 0.5 part by weight, preferably 5 to 20 parts by weight, per 100 parts by weight of the silica.

By treating the colloidal silica with aminosilanes, a condensation reaction (coupling reaction) takes place between the surface silanol groups of the silica and at least one alkoxy group of the aminosilane to give a silica coated with the aminosilane. When the aminosilane contains two or more alkoxy groups, the molecules of aminosilanes react with each other simultaneously with the above condensation reaction, thereby forming a siloxane linkage and forming a three-dimensionally crosslinked coating of the aminosilane on the silica.

The silica treated with the aminosilane has a general structure represented by the following formula wherein the amine functional group is pendent to and covalently bound to the silica through an intermediate $R^4$ linkage.

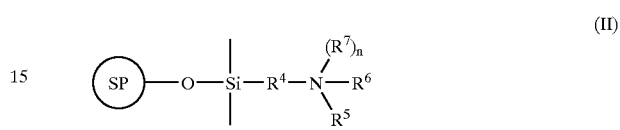

(II)

$R^4$, $R^5$, $R^6$, $R^7$, and n are defined as for Formula I.

Most colloidal silica sols also contain an alkali. The alkali is usually an alkali metal hydroxide from Group IA of the Periodic Table (hydroxides of lithium, sodium, potassium, etc.) Most commercially available colloidal silica sols contain sodium hydroxide, which originates, at least partially, from the sodium silicate used to make the colloidal silica, although sodium hydroxide may also be added to stabilize the sol against gelation.

In certain instances, it may be useful to reduce the aforementioned alkali to levels lower than commercially available colloidal silica sols. Suitable low alkali silicas have a silica solids to sodium weight ratio according to the equation below:

$$SiO_2/\text{Alkali Metal} \geq AW(-0.013*SSA+9) \qquad \text{Equation 1.}$$

The $SiO_2$/alkali metal is the weight ratio of silica solids and alkali metal content[1] in the colloidal silica sol. AW is the atomic weight of the alkali metal, e.g., 6.9 for lithium, 23 for sodium, and 39 for potassium, and SSA is the specific surface area of the colloidal silica particles in units of square meters per gram (m$^2$/g). When the alkali metal is sodium, the $SiO_2$/Alkali Metal ratio is at least the sum of −0.30SSA+ 207.

[1] Alkali metal (e.g., Na) Content—percentage by weight based on alkali metal ion content measured using the inductively coupled plasma-atomic emission (ICP-AES) spectroscopy technique. The sample is first dissolved at ambient conditions, e.g., 25° C. and 75% relative humidity, in hydrofluoric acid and nitric acid (at a 30/70 weight ratio) before applying this technique. The sample is allowed to dissolve for sixteen hours before measurements are taken.

A low alkali cationic colloidal silica can be prepared by deionizing it to an extent such that the colloidal silica has a silica solids to alkali metal ratio referred to in Equation 1. By "deionized," it is meant that any metal ions, e.g., alkali metal ions such as sodium, have been removed from the colloidal silica solution. Methods to remove alkali metal ions are well known and include ion exchange with a suitable ion exchange resin (U.S. Pat. Nos. 2,577,484 and 2,577,485), dialysis (U.S. Pat. No. 2,773,028) and electrodialysis (U.S. Pat. No. 3,969,266).

Then the deionized cationic silica would be further treated or modified so as to possess a net positive charge.

As indicated below, the colloidal silicas can be incorporated in conventional coating binders. The binder not only acts to bind the colloidal silica and to form a film, it also provides adhesiveness to the interface between the gloss-providing layer and the substrate or any intermediate ink-receiving layer between the glossy layer and substrate.

Cationic and nonionic binders are particularly suitable in the present invention. Suitable binders include, but are not limited to, styrene-butadiene or styrene-acrylate copolymers having functional cationic groups and/or cationic polyvinyl acetates, cationic polyvinyl alcohols or their copolymers.

Furthermore, the binder can be selected from the group of decomposed and native guars, starches, methyl celluloses, hydroxymethyl celluloses, carboxymethyl celluloses, alginates, proteins and polyvinyl alcohols which are present in cationic form. Proteins are also suitable because they are amphoteric.

Specific examples of cationic water-soluble binders include, for example, diethylaminoethylated starch, trimethylethylammonium chloride-modified starch, and diethylaminoethyl ammonium-methyl chloride salt-modified starch; and cation-modified acrylic ester copolymers.

Suitable non-ionic, water-soluble binders include, but are not limited to, polyvinyl alcohol, hydroxyethyl cellulose, methyl cellulose, dextrin, pluran, starch, gum arabic, dextran, polyethylene glycol, polyvinyl pyrrolidone, polyacrylamide, and polypropylene glycol.

Water-insoluble or poorly water-soluble cationic or non-ionic binders in the form of an aqueous emulsion, include but are not limited to, acrylic and methacrylic copolymer resins, for example, methyl methacrylate-butyl acrylate copolymer resins, methyl methacrylate-ethyl acrylate copolymer resins, methyl methacrylate-2-ethylhexyl acrylate copolymer resins, methylmethacrylate-methyl acrylate copolymer resins, styrene-butyl acrylate copolymer resins, styrene-2-ethylhexyl acrylate copolymer resins, styrene-ethyl acrylate copolymer reins, styrene-methylacrylate copolymer resins, methyl methacrylate-styrene-butyl acrylate copolymer resins, methyl methacrylate-styrene-2-ethylhexyl acrylate copolymer resins, methyl methacrylate-styrene-ethyl acrylate copolymer resins, methyl methacrylate-styrene-ethyl acrylate copolymer resins, methyl methacrylate-styrene-methyl acrylate copolymer resins, styrene-butyl acrylate-acrylonitrile copolymer resins, and styrene-ethyl acrylate-acrylonitrile copolymer resins.

Other suitable binders include casein, gelatin, a maleic anhydride resin, a conjugated diene-type copolymer latex such as a vinyl-type polymer latex such as an ethylene-vinyl acetate copolymer; a synthetic resin-type binder such as a polyurethane resin, an unsaturated polyester resin, a vinyl chloride-vinyl acetate copolymer, polyvinyl butyral or an alkyd resin.

The binder can be combined with the colloidal silica using conventional blenders and mixers. The components can be combined and mixed at ambient conditions.

It is desirable for the colloidal silica solids and binder solids to be present in the coating at relatively high ratios. It has been found that in certain embodiments higher silica to binder ratios provide good printability, as well as provide advantageous mechanical properties to the finished ink receptive coating sheet. It is particularly desirable for the colloidal silica and binder solids to be present at a ratio of at least 1:1, and more preferably 6:4 to 4:1 by weight. The ratio can be as high as 9.9:1. The colloidal silica to binder solids ratio is also referred to herein as pigment to binder ratio.

It may also be desirable to include additional components in the coating composition of this invention. The coating of this invention can contain one or more of the following: dispersant, thickener, fluidity-improving agent, defoaming agent, foam-suppressing agent, release agent, blowing agent, penetrating agent, coloring dye, coloring pigment, fluorescent brightener, ultraviolet absorber, anti-oxidant, preservative, ash-preventing agent, waterproofing agent, and wet-strength agent.

Cationic dye mordant is a preferred additive. Examples of suitable mordants include, but are not limited to, a polymeric quaternary ammonium compound, or a basic polymer, such as poly(dimethylaminoethyl)-methacrylate, polyalkylenepolyamines, and products of the condensation thereof with dicyanodiamide, amine-epichlorohydrin polycondensates; lecithin and phospholipid compounds. Specific examples of such mordants include the following: vinylbenzyl trimethyl ammonium chloride/ethylene glycol dimethacrylate; poly-(diallyl dimethyl ammonium chloride); poly(2-N,N,N-trimethylammonium)ethyl methacrylate methosulfate; poly(3-N,N,N-trimethyl-ammonium)propyl methacrylate chloride; a copolymer of vinylpyrrolidinone and vinyl(N-methylimidazolium chloride; and hydroxyethylcellulose derivatized with 3-N,N,N-trimethylammonium)propyl chloride. In a preferred embodiment, the cationic mordant is a quaternary ammonium compound.

The mordant which may be used in the invention can be employed in any amount effective for the intended purpose. In general, good results are obtained when the mordant is present in an amount of from about 0.1–10% by weight of the total coating formulation. These mordants are especially preferred when the binder is nonionic.

A portion of the cationic colloidal silica of this invention can be replaced by one or more other colloidal materials, e.g., monodisperse cationic colloidal silica, provided the amount of such colloidal material does not detract from the overall cationic nature, gloss or printability desired for the finished coating. These other colloidal materials can be silica, as well as inorganic oxides other than silica, e.g., alumina, titania, zirconia, and the like. Such additional inorganic oxide colloidal particles can be added as a filler and/or as additional pigment.

The coatings of this invention have a gloss of at least thirty (30) at 60° according to a BYK Gardner measuring instrument. Preferable coatings according to this invention have a gloss of at least 80 at a 6:4 colloidal silica to binder ratio and at least 50, and preferably at least 70 at a 4:1 colloidal silica to binder ratio. Even more preferred, the coating has a gloss of at least 90 at a 4:1 colloidal silica to binder ratio.

Suitable supports for preparing the ink recording sheet of this invention can be those typically used in the art. Suitable supports include those having a weight in the range of about 40 to about 300 $g/m^2$. The support may be base paper produced from a variety of processes and machines such as a Fourdrinier paper machine, a cylinder paper machine or a twin wire paper machine. The supports are prepared by mixing its main components, i.e., a conventional pigment and a wood pulp including, for example, a chemical pulp, a mechanical pulp, and a waste paper pulp, with at least one of various additives including a binder, a sizing agent, a fixing agent, a yield-improving agent, a cationic agent and a paper strength-increasing agent. Other supports include transparent substrates, fabrics and the like.

Further, the support may also be size-pressed paper sheets prepared using starch or polyvinyl alcohol. The support can also be one which has an anchor coat layer thereon, e.g., paper already having a preliminary coating layer provided on a base paper. The base paper may also have an ink-receiving layer applied prior to applying the coating of this invention.

Coatings comprising colloidal silica, binder and optional additives can be applied online as the support is being prepared, or offline after the support has been finished. The coating can be applied using conventional coating techniques, such as air knife coating, roll coating, blade coating, bar coating, curtain coating, die coating, and processes using metered size presses. The resulting coatings can be dried by ambient room temperature, hot air drying methods, heated surface contact drying or radiation drying. Typically, the coating composition of the invention, and any optional intermediate layers, is applied in a range of 1 to 50 g/m², but more typically in the range of 2 to 20 g/m².

The examples below show that a glossy ink jet recording sheet having good printability can be prepared essentially from a support and one layer of the invention. However, it may be desirable in certain instances to place another layer, which is ink receptive, between the gloss providing layer of the invention and the support to enhance the printability of the final sheet.

Suitable ink receptive layers are those identified as such in U.S. Pat. No. 5,576,088, the contents of which are incorporated herein by reference. Briefly, suitable ink receptive layers comprise a binder such as the water soluble binders listed above, and an ink receptive pigment. Such pigments include a white inorganic pigment such as light calcium carbonate, heavy calcium carbonate, magnesium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, alumina, colloidal alumina, pseudo boehmite, aluminum hydroxide, lithopone, zeolite, hydrolyzed halloysite or magnesium hydroxide, or an organic pigment such as a styrene-type plastic pigment, an acrylic plastic pigment, polyethylene, microcapsules, a urea resin or a melamine resin. Suitable pigments for the ink receptive layer have average particle sizes in the range of 0.5 to 3.0 microns (measured by light scattering) and pore volumes ranging from 0.5 to 3.0 cc/g and preferably pore volumes of 1.0 to 2.0 cc/g, as measured by nitrogen porosimetry. In order to obtain an ink jet recording sheet having a high ink absorptivity, it is preferred that the pigment in the ink-receiving layer contains at least 30 vol. % of particles having a particle size of at least 1.0 µm.

The preferred embodiments, and modes of operation of the present invention have been described in the foregoing specification. The invention which is intended to be protected herein, however, is not to be construed as limited to the particular embodiments disclosed, since they are to be regarded as illustrative rather than restrictive. Variations and changes, therefore, may be made by those skilled in the art without departing from the spirit of this invention.

Further, any range of numbers recited in the specification or claims, such as that representing a particular set of properties, conditions, physical states or percentages, is intended to literally incorporate expressly herein any number falling within such range, including any subset ranges of numbers within any range so recited.

ILLUSTRATIVE EXAMPLES

The parameters listed below and/or indicated earlier were measured as follows:

Average Particle Size—unless indicated otherwise is a number average particle size determined by the equation SSA=3100/$d_n$ wherein $d_n$ is the average particle size and SSA is the specific surface area defined below Median Particle Size—is a number weighted median measured by electron microscopy (TEM).

Gloss—measured using a BYK Gardner micro-TRI-gloss instrument which has been calibrated on a transparent film. The gloss values were measured using a 60° geometry.

Silica Solids Content—measured in an Ohaus furnace at 205° C., with the end point for the solids measurement being when the sample weight change is less than 0.01 g for sixty (60) seconds.

Specific Surface Area—titrimetric method correlated to surface area by nitrogen adsorption as given by G. W. Sears, Jr., Analytical Chemistry, Vol. 28, p. 1981, (1956).

Printability (or print quality)—is evaluated by observing the appearance of the green, blue and red colored blocks in a printed image prepared from an Epson Stylus 870 color printer after drying the coating using a stream of warm air at 37° C. The methodology for making these observations is as follows:

Color uniformity and bleed were evaluated for each of the colors. The combined rating for the two evaluations is as follows:

Excellent=All colors appear uniform and there is no bleeding outside the print area.

Good=Colors are not completely uniform and bleed occurs in at least one of the color blocks.

Poor=Colors appear non-uniform and ink puddling occurs for at least one color; there also is severe bleeding.

Example 1. (Comparison)

Martoxin® GL3 (SSA=332 m²/g) alumina from Martinwerks was peptized according to the manufacturer's procedures. Martoxin® GL3 powder was added to deionized (DI) water at a 15% solids level and stirred for 5 minutes. Then the pH was adjusted to 4.5 with acetic acid and the slurry stirred for 10 more minutes. At the end the pH was again adjusted to 4.5 with acetic acid. 21.015 g (15 wt. %) of the above prepared colloidal alumina slurry was placed in a beaker. To that, 4.85 g of Airvol® 523 (15.5 wt. % solution) polyvinyl alcohol were added. Then, 0.19 g of Agefloc® B50 dye mordant (50 wt. %), diluted with 0.768 g of deionized water was added to the mixture. The resulting formulation was coated as a 100 micron wet film on Melinex™-534 polyester, opaque white film, from E. I. DuPont de Nemours & Co. using a K control coater from Testing Machine Inc. (TMI) using a number 8 rod which deposits a wet film thickness of 100 microns. The obtained coating had a gloss of 93% at 60 degrees. Printability was poor.

Example 2. (Comparison)

10.01 g of Ludox® CL-P (40% solids; 140 SSA; 22 nm average particle size; % (by weight) Na=0.250; $SiO_2$/Na=160) cationic colloidal silica from W. R. Grace & Co.-Conn. were placed in a beaker and diluted with 10.31 g of deionized water. To that, 5.81 g of Airvol® 523 (15.5 wt. % solution) polyvinyl alcohol were added followed by 0.22 g of Agefloc® B50 (50 wt. %). The resulting formulation was coated on polyester film as described in Example 1. The obtained coating had a gloss of 4% at 60 degrees.

Example 3. (Comparison)

84 g of deionized water was added to 329 g of Ludox® HS-40 (W. R. Grace) colloidal silica containing 40.0% $SiO_2$ with average particle size=12 nm and having specific surface area=220 m²/g. The mixture was heated to 40–50° C. and Amberlite® IR-120 Plus cation exchange resin in the hydrogen form was added with stirring in small amounts until the pH dropped to 2.5. Stirring and temperature were maintained for 1 hour, during which small amounts of resin were added to maintain pH in the range of 2.5–3.0. The mixture was filtered through coarse filter paper to separate the deionized colloidal silica sol from the resin. 1% ammonium hydroxide solution was added to the deionized colloidal silica sol dropwise, with stirring, until the sol reached the range of pH 7.2–7.5.

The resulting colloidal silica sol was added dropwise into a beaker containing 87.2 g of 45% aluminum chlorohydrol (20.7% $Al_2O_3$ and Al:Cl atomic ratio of 2:1) with rapid stirring. After the addition was complete, the mixture was allowed to equilibrate for about 12 hours, then filtered through fine filter paper. The resulting sol contained 30% solids, exhibited a pH of 3.5.

14.51 g of the above product (30 wt. %) were placed in a beaker and diluted with 7.52 g of deionized water. To that, 6.27 g of Airvol® 523 (15.5 wt. % solution) polyvinyl alcohol were added followed by 0.22 g of Agefloc® B50 (50 wt. %). The resulting formulation was coated on polyester film under conditions described in Example 1. The obtained coating had a gloss of 93% at 60 degrees. Printability was good.

Example 4.

A polydispersed colloidal silica was used in this Example. The sol had a 50 wt. % solids, a median particle size of 22 nanometers, 80% particle span of about 40 nanometers, specific surface area of 70 m²/g, a zeta potential of +61 mV (at pH of 4) and silica solids to sodium ratio of 179. 5070 g of the above polydispersed colloidal silica was acidified with 6N hydrochloric acid to pH=4.

In separate container 317 g of DI water were mixed with 250 g of 1N HCl. To that 63.5 g of 3-aminopropyltriethoxysilane were added dropwise. After all the silane was added the pH was adjusted to pH=4 with 1N HCl. This solution was then added to the acidified colloidal silica, and the final % silica solids were adjusted to 40% with the addition of DI water. The material had a sodium level of 0.239 and a $SiO_2$/Na level of 167.

7.51 g of the above-prepared material (40 wt. %) were placed in a beaker and diluted with 10.08 g of deionized water. To that, 4.36 g of Airvol® 523 (15.5 wt. % solution) were added followed by 0.18 g of Agefloc® B50 (50 wt. %). The resulting formulation was coated on polyester film. The obtained coating had a gloss of 85% at 60 degrees. The print quality was excellent.

Example 5. (Comparison)

500 g of Ludox™ (50% silica) colloidal silica from W. R. Grace & Co.-Conn. was acidified with 6N hydrochloric acid to pH=4. In a separate container 31.2 of DI water were mixed with 30 g of 1N HCl. To that 6.25 g of 3-aminopropyltriethoxysilane were added dropwise. After all the silane was added the pH was adjusted to pH=4 with 1N HCl. This solution was then added to the acidified colloidal silica, and the final % silica solids were adjusted to 45% with the addition of DI water.

6.63 g of the above-prepared material (45 wt. %) were placed in a beaker and diluted with 10.89 g of deionized water. To that, 4.35 g of Airvol® 523 (15.5 wt. % solution) were added followed by 0.15 g of Agefloc® B50 (50 wt. %). The resulting formulation was coated on polyester film. The obtained coating had a gloss of 81% at 60 degrees. The print quality (Epson-870) was poor.

Example 6. (Storage Stability)

The colloidal silica sols from each of the above Examples were then stored in a closed plastic bottle at 25° C. to evaluate the storage stability of each. The results are as follows:

Example 1 Martoxin GL3: The final slurry (15% solids) after peptizing remains fluid for about 4 days. Thereafter the dispersion became viscous.

Example 2 Ludox CL-P (40% solids): No changes are noted after storage for one year.

Example 3 Deionized HS-40/treated with aluminum chlorohydrol (30% solids): Material is stable towards particle size growth for at least 7 months. The gloss values, obtained with an 80/18/2 (Pigment/PVOH/cationic) formulation, were dependant on the age of the material. Fresh material gave a gloss value of 93%, whereas a 14-day old sample provided a gloss of only 28%.

Example 4 Silanized Polydispersed Silica of the Invention (2.5% silane based on solids) (40% solids): Material stable for at least 6 months. The gloss values of coatings remain greater than 80% after 6 months.

Example 5 Ludox™ silanized (2.5% silane based on solids) (45% solids): Material gels after ~43 days.

What is claimed:

1. An ink jet recording sheet comprising a support and at least one coating layer thereon, said at least one coating layer (a) having a specular surface gloss of at least 30 at 60°, (b) comprising polydispersed cationic colloidal silica possessing a net positive charge, and (c) binder, wherein the colloidal silica solids and binder solids are present at a ratio of at least 1:1 by weight.

2. An ink jet recording sheet according to claim 1 wherein the ratio of colloidal silica solids to binder solids is in the range of about 6:4 to about 4:1.

3. An ink jet recording sheet according to claim 1 wherein the colloidal silica has an average particle size in the range of about 1 to about 300 nanometers.

4. An ink jet recording sheet according to claim 1 wherein the colloidal silica has a median particle size in the range of 15 to 100 nm and has a particle size distribution such that at least 80% of the particles span a size range of at least 30 nanometers and up to about 70 nanometers.

5. An ink jet recording sheet according to claim 1 wherein the colloidal silica comprises at least one functional group.

6. An ink jet recording sheet according to claim 5 wherein the functional group is amino and the amino is attached to the silica through an alkyl linkage.

7. A coating composition comprising (a) polydispersed cationic colloidal silica possessing a positive charge, and (b) binder wherein silica solids of (a) and binder solids of (b) are present at a ratio of at least 1:1 by weight.

8. A coating composition according to claim 7 wherein the silica solids of (a) to binder solids of (b) is in the range of about 6:4 to about 4:1.

9. A coating composition according to claim 7 wherein the colloidal silica has an average particle size of about 1 to about 300 nanometers.

10. A coating composition according to claim 7 wherein the colloidal silica has a median particle size in the range of 15 to 100 nm and has a particle size distribution such that at least 80% of the particles span a size range of at least 30 nanometers and up to about 70 nanometers.

11. A coating composition according to claim 7 wherein the colloidal silica comprises at least one functional group.

12. An coating composition according to claim 11 which the functional group is amino and the amino is attached to the silica through an alkyl linkage.

13. A coating composition according to claim 11 wherein the at least one functional group is selected from the group consisting of primary amines, secondary amines, tertiary amines and quaternary amines.

14. An coating composition according to claim 5 wherein the functional group is the selected from the group consisting of primary amines, secondary amines, tertiary amines and quaternary amines.

* * * * *